Patented June 21, 1932

1,864,427

UNITED STATES PATENT OFFICE

HENRY A. GARDNER, OF WASHINGTON, DISTRICT OF COLUMBIA

REGENERATED CELLULOSE FILMS AND SHEETS

No Drawing. Application filed March 25, 1930. Serial No. 438,912.

This invention relates to regenerated cellulose films and sheets; and it comprises as a new article of manufacture a sheet or film of regenerated cellulose obtained from a viscose solution and containing a co-precipitated resin, usually and advantageously an aryl sulfo amid resin, such as toluene sulfo amid resin, the presence of this resin giving a better resistance to moisture and a heightened electrical resistance, as well as better dielectric properties; the amount of resin varying from that which will give an opalescence to the film to that which will give opacity and the resin frequently being melted in place; and it also comprises a method of making an improved film or sheet of regenerated cellulose wherein a viscose solution is admixed with an alkaline solution of a resin, advantageously an aryl sulfo amid resin, such as toluene sulfo amid resin, and is thereafter formed into sheets in the usual way, an acid coagulating bath being employed to co-precipitate the resin with the cellulose; the washed and purified film being often afterwards passed over heated rolls to produce a partial or complete fusion of the contained resin; all as more fully hereinafter set forth and as claimed.

"Regenerated cellulose" articles are made by extrusion of alkaline cellulose solutions, notably viscose, into an acid precipitating bath; filaments and threads so made forming the basis of one variety of artificial silk or rayon. Sheets and films are also so made; one commercial type being known as cellophane. All these articles are more or less transparent and lustrous. In the case of rayon, and sometimes with sheet cellulose, this luster is undesirable as detracting from the silkiness of appearance.

In another and copending application, Ser. No. 402,552, filed Oct. 25, 1929, of which the present application is a continuation in part, I have described and claimed an improvement in processes of producing said articles and in the products wherein a certain amount of resin is dissolved in the alkaline bath and coprecipitated with the cellulose, thereby reducing transparency to translucency by the creation of an internal opalescence. In this application, I have described my invention as utilized with regard to both threads and sheets or films, claiming it specifically with regard to the threads or rayon.

In the present application I shall describe and claim this invention as applied more specifically to sheets and films; together with certain improvements on my prior invention.

Regenerated cellulose, though physically quite different from natural cellulose, is much the same in its relation to hygroscopic moisture. Like the natural cellulose, it tends to take up and retain a varying amount of water of condition; the amount varying with the hygrometric condition of the atmosphere. Where the sheets of regenerated cellulose are used for wrapping food, this hygrometric moisture is objectionable; and it is also extremely inconvenient in electric applications of regenerated cellulose sheets and films; in relations where it is used as an insulator or as a dielectric. The electrical resistance of regenerated cellulose sheets, like that of paper, varies from day to day. Attempts have been made to waterproof cellophane and like materials by emulsifying mineral oils in the original viscose; but these have not been successful. Other attempts have been made to provide cellophane and the like with a varnish coating, but these have also been unsatisfactory by reason of an increase in stiffness and of a lack of a cohering union between the varnish coating and the underlying cellulose. With coated cellophane used for wrapping moist food, the coating tends to strip. Most varnishes do not cohere well to cellulose and in the case of cellophane, there is not the locking union given by the fibers of paper.

I have found however that by coprecipitation of a resin with the cellulose in making these sheets and films of regenerated cellulose, the material is waterproofed to a substantial extent and its electrical resistance is enormously increased. Nor does the resistance vary from day to day, as in the case of ordinary cellophane. The properties of the product however vary considerably with the particular resin used.

All sorts of resins, natural and artificial, can be dissolved in the viscose or other alkaline cellulose solutions, such as ammonia-copper oxid solutions. I may use in my process resinous bodies which are soluble in alkaline spinning solutions but which are precipitated by acid solutions. With such resins, when the cellulose is regenerated in the spinning bath, the resin is coprecipitated with the regenerated cellulose. Whatever the resin, it is best light-colored. For special purposes, it may be dyed by solutions of dyes therein. I have used light-colored ordinary rosin and a number of other commercial resins both natural and artificial. But the most suitable resins I find to be of the general class of which toluene sulfo amid resin, made by treating a toluidin sulfo acid with formaldehyde, is an example. Similar resins may be made containing other aryl groups. I regard as suitable similar resins made by sulfonating and amidating benzene or xylene and then condensing with formaldehyde.

These resins made by condensing the noted bodies with formaldehyde, and particularly the toluene sulfo amid resin, give brilliantly clear water white solutions with alkali. On precipitation, by acidulation, the resin comes out as a milky suspension or dispersion; the dispersoid being extremely fine.

So far as producing haze or opalescence is concerned, other bodies than resins can be coprecipitated with the cellulose; but the resins give the best waterproofing and electrical results. An article attractive in appearance can be made, for example, by dissolving barium chlorid in viscose and coagulating by the usual sulfuric acid bath.

The amount of resin used in the bath depends upon the appearance wanted and also the waterproofing desired. So far as extrusion and precipitation are concerned, the methods and baths employed are as usual. However, in subsequent washing for the purpose of removing sulfur, an alkali wash is not suitable. Thiosulfate baths are suitable for removing sulfur.

In precipitation, the resin is thrown out as a colloid suspension. Any desired amount of resin can be employed but I generally use somewhere between 5 and 20 per cent, calculated on the weight of the cellulose. As so far described, I have made the sheet more or less opaque in improving its electrical properties and its properties as regards water. The opaque result is not however necessary, since resin may be melted in situ to a greater or less extent, by passing the cellulose sheet over a properly heated roll. The contained resin can be wholly or partially melted with corresponding optical results. High proportions of resin in so-treated sheets may be employed, without interfering with the transparency; this being particularly true where the described toluene sulfo amid is used.

In another and prior patent, No. 1,564,664, I have described and claimed paratoluene sulfo amid-formaldehyde resins as solid solvents for nitrocellulose and the like. In the present invention, the resin is used in another way.

My new products have a combination of desirable properties which readily suggest to those skilled in the art various applications and uses which have been hitherto unobtainable with regenerated cellulose materials, I may mention that the treated sheets produced by the present invention are useful in wrapping iron pipe to protect it from corrosion and passage of stray electrical currents which would accelerate corrosion, for instance, iron pipe which is buried in the ground and used for carrying petroleum, gas and other products. The present products are also useful in wrapping telephone cables. My products possess a high degree of water resistance. When it is desired to have a cellophane sheet possessing different physical properties to meet unusual or special conditions, sheets of regenerated cellulose produced by my present process may be varnished with a cellulose ester solution containing, usually, about two parts of paratoluene sulfo amid resins to one part of cellulose ester, both being dissolved in suitable solvents. The so-coated sheets have an exceedingly high water resistance. And the coating does not strip, the external resin of the coating probably bonding with the internal resin in the cellophane.

What I claim is:—

1. The process of lessening the hygroscopicity of regenerated cellulose sheets and films prepared by extrusion of alkaline cellulose solutions into acid baths which comprises dissolving an aryl sulfo amid resin, the aryl group being a nucleus of the class consisting of benzene, toluene and xylene nuclei, in the alkali of said alkaline solution, extruding the alkaline solution thus obtained into an acid bath and coprecipitating said resin and the cellulose.

2. The process of lessening the hygroscopicity of regenerated cellulose sheets and films prepared by extrusion of viscose solutions which comprises dissolving an aryl sulfo amid resin, the aryl group being a nucleus of the class consisting of benzene, toluene and xylene nuceli, in the alkali of said viscose solution, extruding the solution thus obtained into an acid bath and coprecipitating said aryl sulfo amid resin and the cellulose.

3. The process of lessening the hygroscopicity of regenerated cellulose sheets and films prepared by extrusion of viscose solutions which comprises dissolving toluene sulfo amid resin in the alkali of said viscose, extruding the solution thus obtained into an acid bath and coprecipitating the said toluene sulfo amid resin and the cellulose.

4. The process of lessening the hygroscopicity of regenerated cellulose sheets and films prepared by extrusion of viscose solutions which comprises dissolving toluene sulfo amid resin in the alkali of said viscose solution, the amount of resin being between 5 and 20 per cent of the weight of the cellulose of said viscose solution, extruding the solution thus obtained into an acid bath and coprecipitating the said toluene sulfo amid resin and the cellulose.

5. The process of preparing waterproofed transparent sheets or films of regenerated cellulose having a high insulating value and good dielectric properties comprising dissolving, an aryl sulfo amid resin, the aryl group being a nucleus of the class consisting of benzene, toluene and xylene nuclei, in a viscose solution, extruding the solution to form a sheet or film, coprecipitating the resin and the cellulose in said sheet or film, washing and drying said film and melting the resin coprecipitated with the cellulose by passing the sheet or film over a heated roller.

6. As a new article, a sheet or film of regenerated cellulose containing coprecipitated aryl sulfo amid resin, the said resin being finely displaced in the regenerated cellulose and being present in such amount as to give an internal haze to the said sheet or film.

7. As a new article, a sheet or film of regenerated cellulose containing coprecipitated resin, said resin having been melted in situ.

8. In the manufacture of regenerated cellulose sheets and films, the process which comprises admixing an alkaline solution of cellulose with an alkaline solution of an aryl sulfo amid resin, the aryl group being a nucleus of the class consisting of benzene, toluene and xylene nuclei, said resin being capable of being precipitated in acid solution, forming sheets and films from the alkaline solution thus obtained, and coprecipitating the said resin and the cellulose by means of an acid bath, the said resin being precipitated out of solution as a fine haze thereby finely dispersing said resin in said regenerated cellulose.

9. In the manufacture of regenerated cellulose sheets and films, the process which comprises admixing together an alkaline solution of cellulose and an alkaline solution of a resinous body said resinous body being an aryl sulfo amid resin, the aryl group being a nucleus of the class consisting of benzene, toluene and xylene nuclei, capable of being precipitated in acid solution, extruding the said mixture into an acid bath to form sheets and films and to coprecipitate the said resinous body and the cellulose.

10. The process of claim 8 wherein the said resinous body is a toluene sulfo amid resin.

11. In processes of manufacturing sheets and films of the regenerated cellulose type from an alkaline solution of cellulose and an aryl sulfo amid resin, the aryl group being a nucleus of the class consisting of benzene, toluene and xylene nuclei, the step which comprises coprecipitating the said resin and the cellulose by means of an acid bath, thereby uniformly distributing and dispersing said resin as a haze-like suspension in the regenerated cellulose.

12. In the manufacture of regenerated cellulose sheets and films, the process which comprises admixing together an alkaline solution of cellulose and an alkaline solution of an aryl sulfo amid resin, the aryl group being a nucleus of the class consisting of benzene, toluene and xylene nuclei, forming sheets and films from the solution thus obtained, coprecipitating the resin and the cellulose by means of an acid bath, washing and drying the solidified sheets and films thus obtained, and heating said solid films and sheets to a temperature sufficient to fuse the resin, to increase the transparency of said sheets and films.

13. As a new article a sheet or film of regenerated cellulose containing a coprecipitated aryl sulfo amid resin, the aryl group being a nucleus of the class consisting of benzene, toluene and xylene nuclei, dispersed therein, said resin being present in amounts between 5 to 10 per cent of the weight of the regenerated cellulose.

14. In the manufacture of regenerated cellulose sheets and films, the process which comprises forming sheets and films from an alkaline solution of cellulose and an aryl sulfo amid resin, the aryl group being a nucleus of the class consisting of benzene, toluene and xylene nuclei, coprecipitating the said resin and the cellulose by means of an acid bath, to solidify said sheets or films, washing and drying the said solid sheets and films, and varnishing the surfaces of said sheets or films with a cellulose ester solution containing a resin.

15. The process of claim 14 wherein said cellulose ester solution comprises a cellulose ester, a toluene sulfo amid resin and a suitable solvent.

16. The process of claim 14 wherein the said solid sheets and films are heated to a temperature sufficient to fuse the said resin prior to applying the said cellulose ester solution.

17. In the manufacture of regenerated cellulose sheets and films, the process which comprises forming sheets and films from an alkaline solution of cellulose and an aryl sulfo amid resin, the aryl group being a nucleus of the class consisting of benzene, toluene and xylene nuclei, coprecipitating the said resin and the cellulose by means of an acid bath, to solidify said sheets and films, washing the said sheets and films with a thiosulfate solution and then drying.

18. As new articles, coated sheets and films comprising regenerated cellulose containing a coprecipitated resin dispersed therein and having on the surface thereof a coating comprising a cellulose ester and a toluene sulfo amid resin.

In testimony whereof, I have hereunto affixed my signature.

HENRY A. GARDNER.

CERTIFICATE OF CORRECTION.

Patent No. 1,864,427.             June 21, 1932.

HENRY A. GARDNER.

It is hereby certified that error appears in the printed specification of the above numbered patent requiring correction as follows: Page 3, line 27, claim 6, for the word "displaced" read dispersed; and that the said Letters Patent should be read with this correction therein that the same may conform to the record of the case in the Patent Office.

Signed and sealed this 4th day of October, A. D. 1932.

M. J. Moore,
Acting Commissioner of Patents.

(Seal)

comprising regenerated cellulose containing a coprecipitated resin dispersed therein and having on the surface thereof a coating comprising a cellulose ester and a toluene sulfo amid resin.

In testimony whereof, I have hereunto affixed my signature.

HENRY A. GARDNER.

CERTIFICATE OF CORRECTION.

Patent No. 1,864,427.      June 21, 1932.

HENRY A. GARDNER.

It is hereby certified that error appears in the printed specification of the above numbered patent requiring correction as follows: Page 3, line 27, claim 6, for the word "displaced" read dispersed; and that the said Letters Patent should be read with this correction therein that the same may conform to the record of the case in the Patent Office.

Signed and sealed this 4th day of October, A. D. 1932.

M. J. Moore,
Acting Commissioner of Patents.

(Seal)

CERTIFICATE OF CORRECTION.

Patent No. 1,864,427.                                              June 21, 1932.

HENRY A. GARDNER.

It is hereby certified that error appears in the printed specification of the above numbered patent requiring correction as follows: Page 3, line 27, claim 6, for the word "displaced" read dispersed; and that the said Letters Patent should be read with this correction therein that the same may conform to the record of the case in the Patent Office.

Signed and sealed this 4th day of October, A. D. 1932.

M. J. Moore,
(Seal)                                                      Acting Commissioner of Patents.